R. M. BROWN.
DUST CAP FOR VALVE STEMS.
APPLICATION FILED JUNE 21, 1915.
1,193,865.
Patented Aug. 8, 1916.
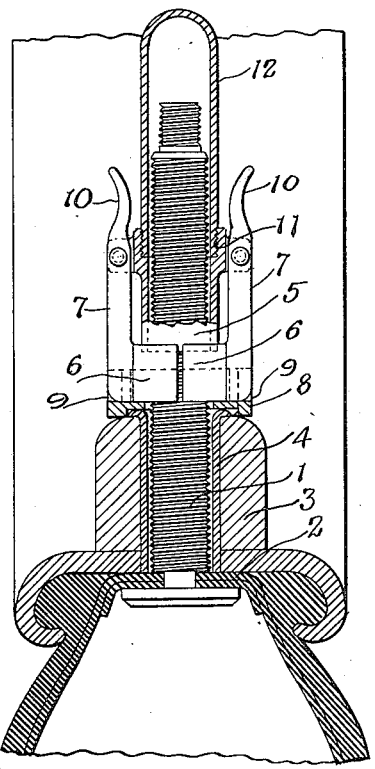
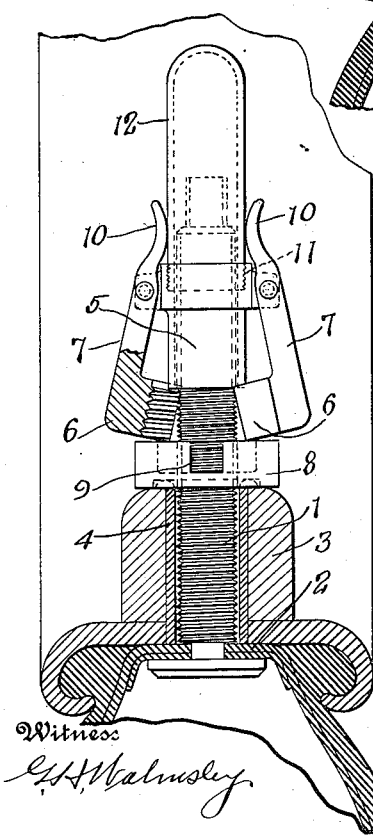
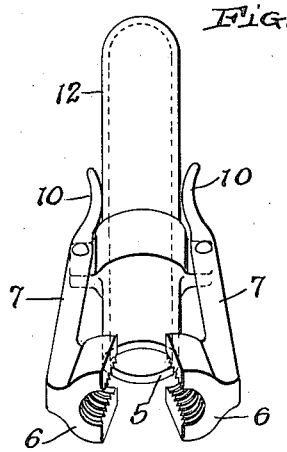
Inventor
Roy M. Brown,
Witness
By
Attorneys

UNITED STATES PATENT OFFICE.

ROY M. BROWN, OF WILMINGTON, OHIO.

DUST-CAP FOR VALVE-STEMS.

1,193,865. Specification of Letters Patent. Patented Aug. 8, 1916.

Application filed June 21, 1915. Serial No. 35,215.

*To all whom it may concern:*

Be it known that I, ROY M. BROWN, a citizen of the United States, residing at Wilmington, in the county of Clinton and State of Ohio, have invented certain new and useful Improvements in Dust-Caps for Valve-Stems, of which the following is a specification, reference being had therein to the accompanying drawing.

This invention relates to dust caps for valve stems of automobile tires, and the like, and more particularly to a combined dust cap and locking nut for such a valve stem. The valve stem of an automobile tire comprises an elongated tube secured to and communicating with the inner tube of the tire and having mounted therein a controlling valve. This stem extends through the rim of the wheel and is screw threaded throughout its length to receive a locking nut by means of which the stem is retained in position. The stem projects for some distance beyond the inner face of the rim and this locking nut must be screwed down against the rim, or a part carried thereby, to lock the stem in position. To prevent dirt entering the stem and to protect the threads of the stem a dust cap is screwed onto the stem. Both the nut and the dust cap must be screwed onto the stem for the full length of that portion projecting beyond the inner face of the rim. When the parts are new and the threads in good condition this is a comparatively simple operation and can be accomplished in a short time. But when the threads become slightly battered or corroded a wrench or other implement must be used to turn both the nut and the dust cap throughout the screw-threaded portion of the stem and this is a very tedious operation and one that is objectionable at any time, but particularly so when it is necessary to remove and replace a tire on the road side.

The object of the present invention is to provide a dust cap which can be applied to the threaded valve stem and tightly secured thereto by screwing the same on the stem for a short distance only; and further to combine with this dust cap a locking nut for the stem which coöperates with the dust cap to lock the stem in position in the rim and to secure the dust cap to the stem.

A further object of the invention is to produce such a device which will be very simple in its construction and operation and which can be applied to valve stems of a standard type, without modification thereof, and which can be produced at a low cost.

In the accompanying drawings, Figure 1 is a sectional view taken transversely of the rim of an automobile wheel and lengthwise of the dust cap, showing the attaching devices in elevation; Fig. 2 is a side elevation, partly broken away of the dust cap and its attaching device showing the latter released to permit the removal of the cap; and Fig. 3 is a perspective view of the dust cap and its attaching device.

In these drawings I have illustrated one embodiment of the invention and have shown the same applied to the valve stem of an automobile tire, the stem being of a standard type. It will be understood, however, that the invention is applicable not only to valve stems of different types but also to elongated screw-threaded devices of different kinds with which coöperates a second member which must be screw-threaded onto the same.

As shown in the drawings the valve stem is indicated by the reference numeral 1 and is secured in the usual manner to the inner tube 2 of an automobile tire, the latter being mounted on the rim 3 of an automobile wheel. The stem extends through an opening in the rim, which is here shown as provided with a bushing 4, and projects some distance beyond the same. The dust cap, 5, is in the form of an elongated tube closed at its outer end and adapted to be slipped onto and off of that portion of the valve stem which projects beyond the inner face of the rim. This tube is without screw threads and has mounted thereon, and forming a part of the dust cap, an attaching device which comprises screw-threaded parts movable into and out of coöperating relation with the screw-threads of the valve stem. As here shown, these screw-threaded parts of the attaching device are in the form of a two part collar 6 which is divided longitudinally and provided with interior screw threads. Each part of the collar is carried by an arm 7 which is pivotally mounted on the outer wall of the dust cap at a point removed from the open end thereof, thereby permitting the two parts of the screw-threaded collar to swing toward and away from the valve stem. Coöperating with these screw-threaded parts of the attaching device is a collar 8 which is loosely mounted on the valve stem, without screw threads, and is arranged between the dust cap and the rim, this rim, or the end of the bushing 4, constituting a stop against which the collar bears. This collar when combined with the screw-threaded parts of the attaching device constitutes a locking nut to retain the valve stem in position in the rim. This collar has parts extending axially thereof to engage the attaching device and hold the screw-threaded portions thereof in engagement with the screw threads of the valve stem. In the present instance the collar is provided with a peripheral flange, forming within the same a recess to receive the lower portion of the divided collar 6 and hold the same in engagement with the threads of the stem. To attach the cap to the stem and to lock the stem in position the parts of the divided collar are moved into such positions that they will not engage the threads of the stem and the cap is slipped over the stem and moved to a point close to the flanged collar 8. The parts of the divided collar are then moved into engagement with the stem and the flanged collar moved along the stem to cause the peripheral flange thereof to extend about the lower part of the divided collar, thus locking the collar in screw-threaded engagement with the stem. By then rotating the cap the screw-threaded collar 6 is caused to travel along the stem and to press the flanged collar 8 firmly into engagement with that part of the rim which constitutes the stop therefor, thus locking the parts together.

In the form of the device here shown the arms 7 project beyond the outer face of the two part collar 6 to form lugs and the flange of the collar 8 is provided with recesses or notches 9 to receive these lugs, thus connecting the attaching device to the flanged collar and causing these parts to rotate together. This feature, however, is optional and satisfactory results can be secured otherwise. Preferably, the arms 7 are provided with finger pieces 10 which are here shown as projecting above their pivotal connections to the cap and are arranged to be engaged by the hand which manipulates the cap to move the threaded parts of the attaching device out of engagement with the stem. Preferably, these finger pieces are so arranged that they will engage the cap and limit the movement of the two parts of the collar, this movement being so gaged that when the cap is placed in position on the stem, the two parts of the collar 6 will engage the edge of the flange of the collar 8. The finger pieces may then be released and the hand moved into engagement with the arms 7 to move the two parts of the collar 6 into engagement with the thread of the stem. If the wheel has been so positioned that the valve stem is at the upper part thereof the flanged collar will drop automatically into engagement with the two parts of the collar 6. If the stem is not at the upper part of the wheel then the collar 8 may be grasped by the fingers and moved into engagement with the attaching device. I also prefer to form the cap proper in two parts so that the outer part can be removed to permit the inflation of the tire without removing the dust cap as a whole. To this end I have divided the cap near its center and have enlarged the outer end of that portion thereof which carries the attaching device and have provided this enlarged portion with internal screw threads, as shown at 11, to receive the screw-threaded end of the outer portion 12 of the cap. Thus, the outer portion of the cap can be removed to permit the inflation of the tire without releasing the stem, because the attaching device of the cap and the flanged collar will remain in locking engagement therewith.

The operation of the device will be readily understood from the foregoing description and it will be apparent that I have provided a dust cap which can be very quickly and easily attached to or removed from the stem. Where the threads are battered or corroded, and it is necessary to use a wrench to turn the cap, a comparatively few movements of the wrench will suffice to release the attaching device and permit it to be moved out of engagement with the stem. Further, it will be apparent that the construction is such that it can be readily applied to the standard stems and requires no special construction, and no modification, of the stem to receive the same. Likewise, it is of an inexpensive character and can be manufactured and sold at a low cost, either as a part of the equipment or as an accessory. Likewise, it will be apparent that while the invention is especially adapted for the use herein described it can readily be adapted to devices other than valve stems and their caps.

While I have shown and described one embodiment of the invention it will be understood that this has been chosen for the purposes of illustration only and that I do not desire to be limited to the details of construction shown and described, for obvious modifications will occur to a person skilled in the art.

Having thus fully described my invention, what I claim as new and desire to secure by Letters Patent, is:—

1. The combination, with an elongated member having exterior screw threads, of a second member removably mounted on said elongated member, an attaching device mounted on the outside of said second member and having screw-threaded portions movable into and out of engagement with the threads of said elongated member, and a retaining device mounted on said elongated member movable into and out of engagement with said attaching device and adapted to retain the threaded portions thereof in engagement with said elongated member.

2. The combination, with an elongated member having exterior screw threads, of a second member removably mounted on said elongated member, an attaching device mounted on the outside of said second member and having screw-threaded portions movable into and out of engagement with the threads of said elongated member, and a collar loosely mounted on said elongated member below said second member and having parts to engage said attaching device and retain the threaded portions thereof in engagement with said elongated member.

3. The combination, with an elongated member having exterior screw threads and a part arranged at a point between the ends of said member to form a stop, of a hollow member adapted to be placed loosely about said elongated member, and an attaching device comprising manually operable finger pieces mounted on said hollow member and having screw threaded parts movable into and out of engagement with the threads of said elongated member, and a collar loosely mounted about said elongated member between said hollow member and said stop and having parts to engage said attaching device and hold the threaded parts thereof in engagement with the threads of said elongated member.

4. The combination, with an elongated member having exterior screw-threads, of a second member removably mounted on said elongated member, an attaching device for said second member comprising manually operable arms pivotally mounted thereon and having at their free ends screw-threaded parts adapted to engage the threads of said elongated member, and a retaining device rotatably mounted on said elongated member and having parts to engage the screw-threaded parts of said attaching device to hold the same in engagement with said elongated member.

5. The combination, with an elongated member having exterior screw-threads, and a second member movably mounted on said elongated member, of a manually operable attaching device for said second member comprising a divided collar having interior screw-threads, means for pivotally connecting the parts of said collar to said second member, and a second collar loosely mounted on said elongated member and having an axially extending part arranged to embrace the adjacent portion of said divided collar and hold the latter in engagement with the threads of said elongated member.

6. The combination with an elongated member having exterior screw-threads, a hollow member adapted to be placed about said elongated member, an attaching device for said hollow member comprising manually operable arms pivotally connected with said hollow member, a two part collar having its parts secured to the free ends of the respective arms and provided with interior screw-threads, a second collar loosely mounted about said elongated member below said first-mentioned collar and having that face adjacent to the first-mentioned collar recessed to receive the adjacent portion of said divided collar and hold the two parts thereof in screw-threaded engagement with said elongated member.

7. The combination, with an elongated member having exterior screw-threads, of a hollow member adapted to be placed about said elongated member, an attaching device comprising arms pivotally mounted on said hollow member, and parts carried by said arms and having interior screw-threads to coöperate with the treads of said elongated member, and finger pieces secured to said arms and arranged for manipulating said screw-threaded parts, and a retaining device mounted on said elongated member below said hollow member to engage said attaching device and retain said screw-threaded parts in operative relation with said elongated member.

8. The combination, with a valve stem having exterior screw threads, of a dust cap mounted loosely about the outer portion of said valve stem, an attaching device for said cap comprising finger pieces, and a divided collar having one end extending beyond the open end of said cap and provided with threads to engage the threads of said valve stem, and a collar mounted about said valve stem below said cap to engage said divided collar and to hold the parts thereof in engagement with said valve stem.

9. The combination, with a valve stem having exterior screw-threads, of a cap adapted to be mounted about said valve stem, arms pivotally mounted on said cap, a divided collar having its parts secured to the respective arms and provided with internal screw-threads to coöperate with the threads of said valve stem, said arms projecting beyond the outer surface of said parts of said collar to form lugs, a second collar loosely mounted about said valve stem and having a peripheral flange to extend about the adjacent portion of said divided collar to hold the parts thereof in engagement with said valve stem, said flange having recesses to receive the ends of said arms and to hold said divided collar and said last-mentioned collar against relative rotation.

In testimony whereof, I affix my signature.

ROY M. BROWN.